(12) United States Patent
Dreher et al.

(10) Patent No.: US 12,540,890 B2
(45) Date of Patent: Feb. 3, 2026

(54) SYSTEM FOR CONTINUOUS MEASUREMENT OF OSMOLARITY AND SENSOR AS WELL AS ITS USE

(71) Applicant: Max-Planck-Gesellschaft Zur Foerderung Der Wissenschaften E. V., Munich (DE)

(72) Inventors: Yannik Dreher, Heidelberg (DE); Kerstin Goepfrich, Vaihingen/Enz (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 74 days.

(21) Appl. No.: 18/258,702

(22) PCT Filed: Dec. 23, 2020

(86) PCT No.: PCT/EP2020/087812
§ 371 (c)(1),
(2) Date: Jun. 21, 2023

(87) PCT Pub. No.: WO2022/135720
PCT Pub. Date: Jun. 30, 2022

(65) Prior Publication Data
US 2024/0393220 A1   Nov. 28, 2024

(51) Int. Cl.
*G01N 13/04*   (2006.01)
(52) U.S. Cl.
CPC .................... *G01N 13/04* (2013.01)
(58) Field of Classification Search
CPC .......................................... G01N 13/04
See application file for complete search history.

(56) References Cited

U.S. PATENT DOCUMENTS 3,479,864 A * 11/1969 Patterson ............... B01J 47/14
  73/64.47
5,388,449 A *  2/1995 LeVeen ................. G01N 13/04
  422/82.02

(Continued)

FOREIGN PATENT DOCUMENTS

WO    2013080198 A1   6/2013
WO    WO-2019046557 A1 * 3/2019   ....... G01N 33/54366

OTHER PUBLICATIONS

Ho James C. S. et al., "Mixing Water, Transducing Energy, and Shaping Membranes: Autonomously Self-Regulating Giant Vesicles", US Mar. 8, 2016 (Mar. 8, 2016), vol. 32, No. 9, p. 2151-2163.

*Primary Examiner* — John Fitzgerald
(74) *Attorney, Agent, or Firm* — WCF IP (57) ABSTRACT

In a first aspect the present invention relates to a system for continuous measurement of osmolarity in situ. Said system comprises phase-separated membrane enclosed compartment as the sensor in osmolarity; detection means: a processing unit, and, optionally, an output unit of absolute or relative osmolarity and/or osmolarity changes. Further, the use of the phase-separated membrane enclosed compartment, whereby the membrane is permeable to a solvent and non-permeable to the osmotically active substance for non-invasive osmolarity measurement in a liquid system is described. In addition, a method for determining osmolarity and/or osmolarity change in a system is provided including the phase-separated membrane enclosed compartment, whereby the membrane is a permeable to a solvent and non-permeable to the osmotically active substance. Finally, a set of phase-separated membrane enclosed compartment, whereby the membrane is permeable to a solvent and non-permeable to the osmotically active substance, having predetermined different inner osmolarities useful for cali- (Continued)

brations of osmolarity of an osmolarity measuring system is disclosed.

8 Claims, 3 Drawing Sheets

Specification includes a Sequence Listing.

(56) References Cited

U.S. PATENT DOCUMENTS

| | | | | |
|---|---|---|---|---|
| 2009/0153153 | A1* | 6/2009 | Vogel | G01N 33/48728 |
| | | | | 324/692 |
| 2014/0326056 | A1* | 11/2014 | Eilat | G01N 33/487 |
| | | | | 73/64.47 |
| 2015/0360183 | A1* | 12/2015 | Jensen | C02F 1/44 |
| | | | | 210/641 |

* cited by examiner

SEQUENCE LISTING

```
<160> NUMBER OF SEQ ID NOS: 1

<210> SEQ ID NO 1
<211> LENGTH: 20
<212> TYPE: DNA
<213> ORGANISM: artificial
<220> FEATURE:
<223> OTHER INFORMATION: probe for labelling

<400> SEQUENCE: 1
ctatgtattt tgcacagttt                                                   20
```

SYSTEM FOR CONTINUOUS MEASUREMENT OF OSMOLARITY AND SENSOR AS WELL AS ITS USE

In a first aspect the present invention relates to a system for continuous measurement of osmolarity in situ. Said system comprises phase-separated membrane enclosed compartment as the sensor for osmolarity; detection means; a processing unit, and, optionally, an output unit of absolute or relative osmolarity and/or osmolarity changes. Further, the use of the phase-separated membrane enclosed compartment, whereby the membrane is permeable to a solvent for non-invasive osmolarity measurement in a liquid system is described. In addition, a method for determining osmolarity and/or osmolarity change in a system is provided including the phase-separated membrane enclosed compartment, whereby the membrane is a permeable to a solvent. Finally, a set of phase-separated membrane enclosed compartments, whereby the membrane is permeable to a solvent, having predetermined different inner osmolarities useful for calibrations of osmolarity of an osmolarity measuring system is disclosed.

PRIOR ART

As of today, there are three common types of osmometers: First, the most common osmolarity sensors rely on freeze point depression due to osmotically active agents. While freeze point osmometers offer a precise technique to determine the osmolarity of a sample, they require freezing the whole sample and they are not capable of measuring dynamic osmolarity changes. Moreover, they measure osmolality rather than osmolarity. Second, a rather slow method is to determine the osmotic pressure of a solution using membrane osmometers. This method uses a semipermeable membrane which allows for water flux to balance differences of the osmotic pressure of a reference and the measurement solution. Third, addition of solvents to a solution decreases its vapor pressure. Vapor pressure osmometers use this effect to determine the osmolarity of a sample. However, this again requires non-physiological temperatures. Osmolarity measurements with state of the art osmometers often have a radical influence on the observed system. Common osmometer working principles, like freeze point depression osmometry, are not compatible with live cell experiments due to the necessary temperature gradients. Even less invasive osmolarity measurements are often not compatible with light microscopy and hence cell culture experiments. Moreover, they do not allow for a continuous osmolarity measurement over time and often determine osmolality rather than osmolarity. Furthermore, osmolarity sensors are only capable of measuring the mean osmolarity of the solution and cannot be used to determine local osmolarities and osmolarity gradients. Since every process of a living cell (from e.g. metabolic reactions to DNA replication) continuously changes the osmolarity, a time-resolved and local monitoring system for osmolarity during microscopy experiments is highly desirable.

Phase-separated membrane enclosed compartments refer to compartments which show several characteristics: 1) Their membrane has to be permeable to the solvent of interest. Typically, the solvent is an aqueous based solvent, like water. 2) Their membrane may not be permeable to the osmotically active substance. 3) Their size should be such that they can be resolved with optical/superresolution microscopy. 4) The membrane has to partition into two or more domains. 5) The line tension at the domain boundary has to be sufficiently high compared to the bending energy and the membrane has to be deformable such that osmotic deflation minimizes the contact area between the phases leading to deformation.

Taking together Characteristics 1 and 2, the membrane should be semipermeable. Possible semipermeable membranes include lipid membranes, synthetic or natural polymer membranes, proteinosomes, dendrimersomes or DNA-based membranes. These phase-separated membrane enclosed compartment typically show permeability to a solvent, thus, resulting in change of osmolarity accordingly. Advances in synthetic cell research and lipid vesicle technologies, on the other hand, led to the development of phase-separated giant unilamellar lipid vesicles (GUVs). It has been shown that certain lipid mixtures (often containing cholesterol and DOPC) phase separate into a liquid ordered phase (often containing cholesterol) and a liquid disordered phase (containing e.g. DOPC or other lipids), associated with a line tension along the phase boundary. Shape deformations (including fission of vesicle buds) of phase-separated vesicles due to the line energy and bending energies have been investigated both theoretically [F. Jülicher, R. Lipowsky, Physical Review E-Statistical Physics Plasmas Fluids and Related Interdisciplinary Topics 1996, 53, 2670-2683] and experimentally [T. Baumgart, S. Das, W. W. Webb, J. T. Jenkins, Biophysical Journal 2005, 89, 1067-1080]. However, theoretical descriptions rely on membrane-specific parameters and experiments often report coincidental observations. Phase-separated vesicles have never been used to sense osmolarity.

Hence, there is an ongoing need for in situ but non-invasive and possibly time resolved and real time measurement of osmolarity and osmolarity changes in systems including biological but also chemical systems.

BRIEF DESCRIPTION OF THE PRESENT INVENTION

In a first aspect, a system for continuous measurement of osmolarity in situ is provided, comprising
a. phase-separated membrane enclosed compartment, in particular, phase-separated giant unilamellar lipid vesicles (GUVs) as sensor in osmolarity;
b. detection means;
c. processing unit, and
d. output unit of absolute or relative osmolarity, and/or osmolarity changes.

In addition, the present invention relates to the use of phase-separated membrane enclosed compartment, whereby the membrane is permeable for a solvent and non-permeable for the osmotically active substance for non-invasive osmolarity measurement in a liquid.

Moreover, a method for determining osmolarity and/or osmolarity change in a system, in particular, a biological, chemical or physical system containing the phase-separated membrane enclosed compartment, whereby the membrane is permeable to the solvent and non-permeable for the osmotically active substance, like the membrane of GUVs. The respective compartment is added to the system to determine by optical means the osmolarity or osmolarity change by determining the shape or a change of shape of said phase-separated membrane enclosed compartment, whereby the membrane is permeable to the solvent, like GUVs, is provided.

Finally, the present invention relates to a set of phase-separated membrane enclosed compartments, whereby the membrane is permeable to a solvent and non-permeable to the osmotically active substance, said compartments have at least two different predetermined inner osmolarities and are useful for calibration of osmolarity of an osmolarity measurement system.

BRIEF DESCRIPTION OF THE DRAWINGS

FIG. 3. Division of phase-separated GUVs. Schematic illustration of the division mechanism relying on (a) phase separation of the GUVs and (b) osmosis. Ci denotes the osmolarity outside of the GUVs and Vi describes their volume; i=0, 1, 2. (c) Examplary chemical reaction pathway of sucrose degradation catalyzed by the enzyme invertase for the proof-of-principle of the osmolarity sensor. (d) Osmolarity ratio C/C0 over time for GUV-containing solutions composed of 300 mM sucrose, 10 mM HEPES (pH 7.4) and 44 mg l−1 (blue) or 22 mg l−1 invertase (gray). Error bars are too small to be visible. The data was fitted with limited growth fits (solid lines). This data was measured with a conventional osmometer. (e) Overlay of brightfield and confocal image of a phase-separated GUV with equally large hemispheres (Lipid Mix 1, ld phase labeled with LissRhod PE (orange), λex=561 nm). (f) Confocal fluorescence time series depicting the division process in the presence of 44 mg l−1 invertase. The increase in osmolarity can be monitored as an increase in deformation of the GUV. Scale bars: 10 μm.

FIG. 4: Illustration of a localized osmolarity measurement over time. At a time point to the osmolarity starts to change in the local area (i), e.g. due to metabolic activity of cells present in solution or due to a chemical reaction taking place locally. Hence, the number of solutes in the area (i) is increased at time point t1, leading to the deformation of the GUV localized in area (i). Other GUVs, like the GUV in area (ii) remain unaffected. If the reaction continues over time, the deformation of the GUV continues as illustrated for time point t2.

DETAILED DESCRIPTION OF THE PRESENT INVENTION

In a first aspect, the present invention relates to a system for continuous measurement of osmolarity in situ comprising a. phase-separated membrane enclosed compartment, in particular, phase-separated giant unilamellar lipid vesicles (GUVs) as sensor in osmolarity;
b. detection means;
c. processing unit, and
d. output unit of absolute or relative osmolarity, and/or osmolarity changes.

The present inventor recognized that phase-separated membrane enclosed compartments, whereby the membrane is permeable to a solvent and non-permeable to the osmotically active substance, like biocompatible phase-separated lipid vesicles, represent a tool to continuously determine local osmolarity and osmolarity changes in liquid systems. Namely, due to osmosis, these compartments, typically lipid vesicles like phase-separated giant unilamellar lipid vesicles (GUVs), get deflated in a solution of higher osmolarity than their initial internal osmolarity. Further, it has been recognized that the change of the shape of said compartments, like the vesicles, are directly correlated to the osmolarity present in a system, independent of the vesicle size.

In an embodiment, the phase separated membrane enclosed compartment, like the GUV, has a semi-permeable membrane permeable for the solvent but impermeable for the solute.

Unless otherwise identified herein, the term "compartment" refers to a single compartment or multiple compartments.

The shaped deformation and osmolarity are interconnected with each other and can be calculated in both directions easily. The osmolarity of a solution can be estimated from the vesicle shape and vice versa.

Due to the change of shape of the vesicles it is possible to calculate the local surrounding osmolarity of a phase-separated compartment, like a phase-separated lipid vesicles, using images, typically microscopy images. Calculation is possible using a parameter-free analytical model. In contrast to the methods described in the prior art, osmolarity measurement is possible in situ, locally, time-resolved and in the liquid system.

In addition, the measurement is non-invasive, namely, does not require any additional preparing steps like freezing etc. and it does not harm or influence the sample. Moreover, it is possible to obtain osmolarity measurements over time, e. g. a time resolved osmolarity measurement allowing determination of osmolarity changes over time and with high spatial resolution, e.g. local osmolarity and osmolarity changes. In a particular aspect, it is possible to have a real time measurement of osmolarity in situ and/or a time resolved and a real time measurement of osmolarity change in situ.

That is, the system according to the present invention allows continuous measurement of osmolarity of a liquid the compartments is present in.

In an embodiment of the present invention, the phase-separated membrane enclosed compartment is selected from phase-separated giant unilamellar lipid vesicles (GUVs) or smaller unilamellar lipid vesicles.

In addition, the compartment can be a polymerosome or proteinosome. For example, the membrane can be composed of natural or synthetic polymers, proteins, DNA, dendrimers but preferably lipids.

The line tension at the phase boundary of said phase-separated membrane enclosed compartment is sufficiently high leading to deformation in case of changes in the osmolarity.

In an embodiment, the membrane enclosed compartment is a GUV. GUVs, also known as micron sized vesicles enclosed by a single lipid bilayer, are the most commonly used compartment type as model lipid membranes for biophysical studies or for the assembly of e.g. synthetic cells. Phase-separated GUVs are composed typically of a liquid disordered phase also known as ld phase and a liquid ordered phase (lo phase). The skilled person is well aware of suitable embodiments of GUVs as described in the art. For example, the present inventor recognized that osmotic pressure driven division of phase-separated GUVs is possible. Water evaporation leads to an increase of the osmolarity, namely, the concentration of solvents in an aqueous solution, outside the GUVs. This in turn causes water influx through the GUV membrane, minimizing energy associated with the line tension at the phase boundary and increasing the curvature, namely, changing the shape of the GUVs. The GUV deforms to store the excess membrane area caused by the volume reduction. Eventually, this may lead to division of the vesicles. Of course in case of osmolarity measurement, a division is not desired and can easily prevented by restricting the osmolarity change to a maximum factor of 1.4. For larger osmolarity changes, one can rely on the provided calibration set and use GUVs with different inner osmolarities.

As used herein, the term "solvent" refers to a substance, usually liquid, that dissolves the solute (i.e. the osmotically active particle). The solvent can be polar or non-polar, organic or inorganic, pure or a mixture of different solvents. The preferred solved contains water or is pure water. The compartment membrane should be permeable to the solvent.

The osmotically active substance is the solute of interest dissolved in the solvent. It can be any type of particle or molecule, organic or inorganic, e.g. metabolites, sugar, salts, polymers and others. The compartment membrane should be non-permeable to the osmotically active substance.

Rather, the system according to the present invention is based on determining the shape of the compartment described by suitable detection means and knowing the osmolarity inside of the membrane compartments provided. From this, it is possible to calculate the osmolarity present in the system. Moreover, it is possible to determine osmolarity changes by observing changes in the shape of the phase-separated membrane enclosed compartment.

In an embodiment of the present invention, the measurement of osmolarity is time resolved and/or a real time measurement of osmolarity in situ and/or time resolved or real time measurement of osmolarity change.

In an embodiment of the present invention, the measurement of osmolarity is local and/or a local and real time measurement of osmolarity in situ. Different osmolarities can simultaneously be measured in different positions of the sample, making it possible to derive an osmolarity map of the sample.

In an embodiment, the detection means is an optical detection means for determining and measuring the shape of the compartments accordingly. In an embodiment, the detection means is a camera including CCD cameras, a photomultiplier detector or a detector or means for detecting fluorescence, phase contrast or brightfield signals.

Typically, the detection means includes a microscope. For example, the optical detection means is a light microscope having means for measuring fluorescence emitted. Namely, in an embodiment the optical detection means is a fluorescence microscope, a confocal laser scanning microscope, a spinning disc microscope, a STED/STORM/PALM system, a brightfield microscope or a phase-contrast microscope.

The skilled person is well aware of suitable devices with detection means for determining the shape of the compartments and the changes of said compartments accordingly.

Further, an embodiment of the present invention refers to the system according to the present invention, comprising in addition a container for storing the liquid containing the compartments. Typical useful containers include cell culture chambers, flow chambers, microfluidic chips, petri dishes or conventional cover slides in case of biological systems to be measured and, in addition, bioreactor, chemical reactor and other devices known to be used for receiving liquid and the phase-separated membrane enclosed compartments accordingly.

The container itself can be opened or sealed in an embodiment, allows to contain cells and to culture cells, namely, allow cell cultures. In an embodiment, the system allows continuous measurement of osmolarity in cell culture systems and other biological systems.

The system enables non-invasive osmolarity measurement of cells in a biological system.

The system according to the present invention for continuous measurement of osmolarity may be used as a measuring instrument for various purposes. For example, the system according to the present invention allows continuous measurement of osmolarity in bioreactors and chemical reactors as well as biofermenters.

The system allows real time and time resolved measurement of osmolarity, whereby no samples have to be taken out from the biological system but osmolarity can be measured based on the shape of the phase-separated membrane enclosed compartment present in the biological system, like the fermenter including biofermenters or other cell culture systems.

In a further aspect, the use of phase-separated membrane enclosed compartments, whereby the membrane is permeable to a solvent, like phase-separated giant unilamellar lipid vesicles (GUVs) or smaller unilamellar lipid vesicles for non-invasive osmolarity measurement in a liquid system are provided.

As mentioned above, it has been recognized that a quantitative correlation between the compartment shape and the osmolarity of the environment the compartment is present in, exists. Typically, the compartments are used in a liquid system for non-invasive osmolarity measurement.

Principally, the use for osmolarity measurement can be performed in the liquid, in particular, an aqueous solution. It has been recognized that these compartments, in particular, the phase-separated giant unilamellar lipid vesicles or lipid vesicles in general are stable in a broad range of temperatures, including the physiological range. Thus, the present invention relates in an embodiment to the use of phase-separated membrane enclosed compartment, whereby the membrane is permeable to a solvent, in biological systems containing cells. Typical biological systems where the phase-separated membranes according to the present invention are used include fermenters, like biofermenters, cell culture systems, bioreactors. Furthermore, other types of systems can be used where a liquid solution is present including chemical reactors. In addition, the phase-separated membrane enclosed compartments, allowing osmolarity measurement or determining osmolarity changes in a system can be used as a sensor for example in water, waste water, other types of fluids including observing enzymatic reactors, catalytic reactions, etc. For example, the compartments according to the present invention can be used in bodily fluids, in particular, in vitro for determining osmolarity and osmolarity changes.

In an embodiment of the present invention, the use includes the use in chemical reaction systems where the compartments allow to observe changes in osmolarity over time. The same is true for biological systems requiring observing osmolarity and osmolarity changes over time, in particular, in real time and locally. The system is suitable for spatio-temporal osmolarity mapping.

Hence, the phase-separated membrane enclosed compartments, whereby the membrane is permeable to a solvent and non-permeable to the osmotically active substance, are particularly suitable for determining osmolarity or osmolarity changes in a biological system containing cells. The use is particularly useful for time resolved, in particular, real time measurement of osmolarity and/or osmolarity change in liquids and liquid systems accordingly.

In addition, the compartments, the GUVs, can be used for calibration when compartments and, in particular, GUVs are provided with different predetermined inner osmolarities. Based thereon and the known osmolarity of the predetermined inner osmolarity of said compartments, it is possible to calibrate a system to determine semi-quantitatively or quantitatively osmolarity and osmolarity changes over time.

Furthermore, the use allows to measure local osmolarity, like osmotic gradients in a system due to local changes of the shape of the respective compartments.

Moreover, an advantage of the phase-separated membrane enclosed compartments in biological systems including cells is the fast adaption of the shape and the biocompatibility of the system, thus, allowing non-invasive measurement over time.

The preparation of the compartments, in particular, lipid vesicles, like GUVs, are known in the art and well established. These techniques include electroformation, gentle hydration, emulsion transfer, microfluidic methods, c-dice and release of droplet-stabilized GUVs.

Further, only easily usable means are required for measuring and determining osmolarity in a liquid system. Namely, the detection means, e.g. the microscope, takes an image of the shape and by a data processing unit, the shape is automatically traced and the outline is used to calculate the osmolarity and changes of the shape are used to calculate an absolute or relative osmolarity change. The microscope imagine can be a confocal one, a fluorescence, a brightfield or a phase-contrast image dependent on the detection system used, e.g. the microscope used.

Thus, based on the observation that phase-separated compartments, in particular, phase-separated lipid vesicles adopt a static shape determined by the ratio of its known inner osmolarity and the osmolarity of the solution, the osmolarity of the solution can be determined. The analytical model takes the shape and the inner osmolarity of the vesicle as the only inputs to determine the osmolarity of the solution. The phase-separated membrane enclosed compartment, like phase-separated GUVs, according to the present invention may be GUVs containing lipid mixtures which show phase-separation, in particular mixtures containing cholesterol and phospholipids; more particular a mixture of DOPC (18:1 1,2-dioleoyl-sn-glycero-3-phosphocholine), cholesterol, DPPC (16:0, 1,2-dipalmitoyl-sn-glycero-3-phosphocholine) and cardiolipin or DOPC, SM (18:0 N-stearoyl-D-erythro-sphingosylphosphorylcholine) and cholesterol, optionally with addition of fluorescently labelled lipids.

In an embodiment, the use of the phase-separated membrane enclosed compartment can include uptake by cells, thus, allowing measurement of intercellular osmolarity. That is, both extracellular and intercellular determination of osmolarity is possible.

The cells present in the biological system or the fermenters are typically eukaryotic cells. Of course, also prokaryotic cells can be used.

In a further embodiment of the present invention, a method for determining osmolarity and/or osmolarity change in a system, in particular, a biological system or chemical system comprising providing phase-separated membrane enclosed compartment, whereby the membrane is permeable to a solvent and non-permeable to the osmotically active substance, like GUVs to the system and determining by optical means the osmolarity or osmolarity change by determining the shape or a change of shape of said phase-separated membrane enclosed compartment, whereby the membrane is permeable to the solvent and non-permeable to the osmotically active substance, like GUVs, is provided.

That is, the present invention relates to a method for determining the osmolarity and/or the osmolarity change in a system based on determining shape and shape changes of the phase-separated membrane enclosed compartment, whereby the membrane is permeable to a solvent and non-permeable to the osmotically active substance, like GUVs. The shape and/or changes of the shape are determined by suitable detection means, like optical means. Typically, these optical means is a microscope allowing imaging the shape for further processing of the image. In an embodiment, the processing is by a processing unit calculating the osmolarity based on a parameter-free analytical model, thus, determining the osmolarity present.

In this connection, it is demonstrated that this model is suitable for identifying the osmolarity based on the shape showing the osmolarity ratio required for division is $\sqrt{2}$.

The process increasing the osmolarity ratio between the inner osmolarity and the outer osmolarity lead to a respective shape transformation and, eventually at sufficiently high osmolarity gradients, a division of the vesicle compartment. Complete division is not a requirement for the present osmolarity sensor.

In an embodiment, the method according to the present invention comprises the determination of the shape or change of shape by a non-invasive method which involves taking an image of the shape of the respective compartment.

In an embodiment of the present invention the method comprises taking at least two images, preferably at least two microscopic images at different time points, thus, determining possible change of osmolarity in the system, in particular, the liquid system in which compartments, like GUVs, are present.

In an embodiment, the method is a method for time resolved measurement of osmolarity change or osmolarity, preferably, in a biological system. For example, the biological system is a biological system containing cells. The method includes determining osmolarity in a fermenter system or other liquid systems including different types of water systems like waste water, etc. The method according to the present invention is suitable for determining osmolarity locally in a system, e. g. determining osmotic gradients in a single liquid system. That is, the method relates to the measurement of local osmolarity/osmotic gradient in a biological system based on determining the shape of the phase-separated membrane enclosed compartment, whereby the membrane is permeable to a solvent and non-permeable to the solute, like GUVs, at different positions within a sample.

Further, the method relates to determining osmolarity intracellularly. That is, by uptake of respective compartments, in particular, small, medium sized or giant unilamellar lipid vesicles, it is possible to determine the changes of osmolarity intracellularly, typically, in eukaryotic cells.

In an embodiment, the method is a method for calibrating a system, in particular, a liquid system. Said method comprises providing the phase-separated enclosed compartment, whereby the membrane is permeable to a solvent and non-permeable to the osmotically active substance, like GUVs, with different inner osmolarity. In particular, with different predetermined inner osmolarity, thus, allowing to calibrate the system and, thereafter, enabling semi-quantitative or quantitative determination of the osmolarity.

By preparing and providing vesicles with different inner osmolarities, it is possible to span a broad range of osmolarities including the physiological range. Typically, a range of several hundred of milli-Osmol (from about 1 milliOsm to several Osm) can be provided by providing vesicles with known predetermined inner osmolarity it is possible to construct the respective regression line based on the theoretical model, thus, allowing to determine osmolarity simply based on the shape of the vesicle obtained by a detection means, usually an optical detection means.

Finally, the present invention relates to a set of phase-separated membrane enclosed compartment, whereby the membrane is permeable to a solvent and non-permeable to the osmotically active substance, like GUVs, said compartment have predetermined inner osmolarities of known values useful for calibration of osmolarity measuring system. Thus, based on the shape and symmetry of the vesicle and of the compartment in general, it is possible to predict osmolarity accordingly. It has been recognized that this is independent of the size of the compartment, like the GUV, and that direct connectivity, namely, direct correlation between the shape and the osmolarity is given.

Not to be bound by theory, the following examples will demonstrate suitability of the respective compartments, exemplified by GUVs in a system for continuous measurement as well in a method for continuous measurement of osmolarity.

Based on various experiments, including enzymatic reaction experiments, where the osmolarity is evolving continuously, continuous time resolved osmolarity monitoring is possible. Further, evaporation experiments show that measurement of local osmolarity gradients are possible, which means that in a liquid system vesicles can be present having different sizes and shapes in one part of the system compared to another part of the system. Moreover, phase-separated lipid vesicles can be made from a variety of different lipid mixtures.

In the following, various mixtures including positively charged, neutral and negatively charged vesicles will be described and it will be demonstrated that these represent suitable means for the present invention.

The present invention will be described by way of examples without limiting the invention thereto.

EXAMPLES

GUV Formation

18:1 Atto488-DOPE was purchased from ATTO-TEC GmbH. All other lipids were pur-chased from Avanti Polar Lipids, Inc., and stored in chloroform at 20° C. (for a complete list of used lipids see Table 1).

TABLE 1

| Lipid | Abbreviation | Company |
| --- | --- | --- |
| 18:1 1,2-dioleoyl-sn-glycero-3-phosphocholine | DOPC | Avanti Polar Lipids, inc. |

TABLE 1-continued

| Lipid | Abbreviation | Company |
| --- | --- | --- |
| 16:0 1,2-dipalmitoyl-sn-glycero-3-phosphocholine | DPPC | Avanti Polar Lipids, inc. |
| 18:1 1,2-dioleoyl-3-trimethylammonium-propane | DOTAP | Avanti Polar Lipids, inc. |
| 18:1 1,2-dioleoyl-sn-glycero-3-phospho-(1'-rac-glycerol) | DOPG | Avanti Polar Lipids, inc. |
| 18:1 1,2-dioleoyl-sn-glycero-3-phosphoethanolamine | DOPE | Avanti Polar Lipids, inc. |
| cholesterol (ovine) | Chol | Avanti Polar Lipids, inc. |
| 18:0 N-stearoyl-D-erythro-sphingosylphosphorylcholine | SM | Avanti Polar Lipids, inc. |
| Cardiolipin (Heart, Bovine) | CL | Avanti Polar Lipids, inc. |
| L-α-phosphatidylcholine | EggPC | Avanti Polar Lipids, inc. |
| L-α-phosphatidylglycerol | EggPG | Avanti Polar Lipids, inc. |
| 18:1 1,2-dioleoyl-sn-glycero-3-phosphoethanolamine-N-(Cyanine 5) | Cy5 PE | Avanti Polar Lipids, inc. |
| 18:1 1,2-dipalmitoyl-sn-glycero-3-phosphoethanolamine-N-(lissamine rhodamine B sulfonyl) | LissRhod PE | Avanti Polar Lipids, inc. |
| 18:1 1,2-dioleoyl-sn-glycero-3-phosphoethanolamine-N-(carboxyfluorescein) | CF PE | Avanti Polar Lipids, inc. |
| 16:1 1-palmitoyl-2-6-[(7-nitro-2-1,3-benzoxadiazol-4-yl)amino]hexanoyl-sn-glycero-3-phosphocholine | NBD PC | Avanti Polar Lipids, inc. |
| 18:1 1,2-dioleoyl-sn-glycero-3-phosphoethanolamine-N-(7-nitro-2-1,3-benzoxadiazol-4-yl) | NBD PE | Avanti Polar Lipids, inc. |
| 18:1 Atto488-labelled 1,2-Dioleoyl-sn-glycero-3-phosphoethanolamin | Atto488-DOPE | ATTO-TEC GmbH |

Giant unilamellar vesicles (GUVs) were produced via the electroformation method (Angelova, M. I. & Dimitrov, D. S. Liposome electroformation. Faraday Discussions of the Chemical Society 81, 303 (1986) using a VesiclePrepPro device (Nanion Technologies GmbH). Four types of GUVs were produced for the experiments shown in main. Phase-separated GUVs (Table 2, Mix 1) are composed of 27.125% 18:1 DOPC, 24.75% cholesterol, 37.125% 16:0 DPPC, 10% cardiolipin (CL), 1% 18:1 LissRhod PE if not stated otherwise.

TABLE 2

| Mix No. | Lipid mixture | Phase separation |
| --- | --- | --- |
| 1 | 27.1% DOPC, 24.8% chol, 37.1% DPPC, 10% CL + 1% LissRhod PE | yes |
| 2 | 37.1% DOPC, 24.8% chol, 37.1% DPPC + 1% LissRhod PE | yes |
| 3 | 33% DOPC + 33% SM + 33% chol + 1% NBD PC | yes |

Single-phase GUVs (Mix SP1) are composed of 70% EggPC, 29% EggPG, 1% 18:1 Atto488-DOPE, whereas lo single-phase GUVs are composed of 49.5% 18:1 DOPC, 49.5% cholesterol, 1% CF PE (lo Mix) and ld single-phase GUVs are composed of 4.75% 18:1 DOPC, 74.25% 16:0 DPPC, 20% cardiolipin (CL), 1% 18:1 LissRhod PE (ld Mix). Note that DPPC membranes containing 20 mol % CL were shown to exhibit a ld phase. Furthermore, addition of <10 mol % of DOPC disrupts the order of DPPC membranes. To test the phase separation behavior of GUVs, vesicles from twelve different additional lipid mixtures were prepared. 40 µl of 1 mM lipid mix in CHCL$_3$ were homogeneously spread on the conductive side of an indium tin oxide (ITO) coated glass coverslide (Visiontek Systems Ltd) using a cover slide. The lipid-coated ITO slide was subsequently placed under vacuum for at least 30 min to achieve complete evaporation of the CHCL$_3$. A rubber ring with a diameter of 18 mm was placed on the lipid-coated ITO slide. The ring was filled with 275 µl buffer solution, before creating a sealed chamber by placing a second ITO slide on top. The buffer solution used for the phase-separated GUVs contained 300 mM sucrose (Sigma-Aldrich Corp.) and 10 mM HEPES (Sigma-Aldrich Corp.) and the solution for the lo and ld single-phase GUVs (lo Mix and ld Mix) contained 300 mM sucrose. Both solutions were preheated to 65° C. For the single-phase GUVs (Mix SP1) a 500 mM sucrose solution at room temperature was used. The assembled electroformation chamber was placed into the VesiclePrep-Pro and connected to the electrodes. A programmable AC field was applied across the ITO slides. For the phase-separated GUVs, a custom-written multi-step program with defined temperature, voltage, AC-frequency and duration was used. For both single-phase GUVs the preinstalled Standard program was selected. GUVs were collected immediately after formation according to the protocol and stored at 4° C. for up to 2 days.

Confocal Fluorescence Microscopy

A confocal laser scanning microscope LSM 800 or LSM 880 (Carl Zeiss AG) was used for fluorescence imaging. The images were acquired using a 20× air (Objective Plan-Apochromat 20×/0.8 M27, Carl Zeiss AG) and a 40× water immersion objective (LD C-Apochromat 40×/1.1 W, Carl Zeiss AG). To visualize the phase separation of the GUVs, 6-FAM-labelled cholesterol-tagged DNA (Integrated DNA Technologies, Inc.; DNA sequence: 5' 6-Fam-CTATGTAT-TTTGCACAGTTT-Chol 3'; HPLC purified, DNA #1) was used which partitioned mainly into the lo phase. LissRhod PE labelled the ld phase. 6-FAM and Atto488-DOPE were excited with a 488 nm diode laser (Carl Zeiss AG), LissRhod PE with a diode or Argon laser at 561 nm (Carl Zeiss AG). In order to release the fluorescein for the light-triggered division, CMNB-caged fluorescein was illuminated with a diode laser at 405 nm. Images were analyzed with ImageJ (contrast and brightness adjustments and TrackMate) and Matlab.

Theoretical Predictions

All calculations were carried out with MathWorks Matlab (9.5.0.944444 R2018b) and Jupyter (v. 4.4.0) as described in the main text. The derivation of the equations is shown below Derivation of Theoretical Prediction If we look at the initially spherical vesicle with an initial radius of $r_0$ and a lipid ratio l the initial volume and areas are given by $$V_0 = \frac{4}{3} \cdot \pi \cdot r_0^3 \tag{1}$$

$$A_{tot} = 4 \cdot \pi \cdot r_0^2 \tag{2}$$

$$A_{ld} = l \cdot A_{tot} \tag{3}$$

$$A_{lo} = (1 - l) \cdot A_{tot}. \tag{4}$$

The lipid phases can be represented as sphere segments with radius $r_0$ and a height of $$h_{ld} = A_{ld}/(2 \cdot \pi \cdot r_0) = 2 \cdot l \cdot r_0 \tag{5}$$

$$h_{lo} = A_{lo}/(2 \cdot \pi \cdot r_0) = 2 \cdot (1 - l) \cdot r_0 \tag{6}$$

and a base area of $$s_0 = \sqrt{\frac{A_{ld}}{\pi} - h_{ld}^2} = 2 \cdot r_0 \cdot \sqrt{l - l^2}. \tag{7}$$

If the outer osmolarity is increased from $C_0$ to $C$ the vesicle will deflate and its volume reduce to $$V = V_0 \cdot \frac{C_0}{C}. \tag{8}$$

We assume that the vesicle will deform in a way that the line tension, i.e. the circumference of the base of the spherical caps, gets minimized. This leads again to two spherical caps for each phase with the same reduced radius of the base of the spherical cap s. We can now define a division parameter d that quantifies the progress of the division process as $$d = 1 - s/s_0. \tag{9}$$

The volume of each cap is then given by $$V_i = \frac{\pi}{3}\left(r_i \pm \sqrt{r_i^2 - s^2}\right)\left(s^2 + r_i\left(r_i \pm \sqrt{r_i^2 - s^2}\right)\right) \tag{10}$$

with i=ld, lo and $r_i$ the respective radius of the sphere segments. The area of the new sphere segments stay the same as before and are given by $$A_i = 2 \cdot \pi \cdot r_i \cdot \left(r_i \pm \sqrt{r_i^2 - s^2}\right) \tag{11}$$

Inserting Eq. (11) into Eq. (10) leads to $$V_i = \frac{\pi}{3} \frac{A_i}{2\pi r_i}\left(s^2 + \frac{A_i}{2\pi}\right) \tag{12}$$

The radii $r_i$ of the spherical caps are given by $$r_i = \frac{A_i}{2\pi h_{i,2}} \tag{13}$$

with $$h_{i,2} = \sqrt{\frac{A_i}{\pi} - s^2} \tag{14}$$

the respective new height of the sphere segments. Inserting Eqs. (7), (9), (13) and (14) into Eq. (12) leads to $$V_i = \frac{\pi}{3} \sqrt{\frac{A_i}{\pi} - 4r_0^2(l-l^2)(1-d)^2} \left(4r_0^2(l-l^2)(1-d)^2 + \frac{A_i}{2\pi}\right) \quad (15)$$

By replacing $A_i$ with Eq. (3) and Eq. (4) respectively and using Eq. (1) we obtain $$V_{ld} = V_0\sqrt{l - (1-d)^2 \cdot (l-l^2)} \cdot (2 \cdot (1-d)^2(l-l^2) + l) \equiv V_0 \cdot T_1 \quad (16)$$

$$V_{lo} = \quad (17)$$

$$v_0\sqrt{(1-l) - (1-d)^2 \cdot (l-l^2)} \cdot (2 \cdot (1-d)^2(l-l^2) + (1-l)) \equiv V_0 \cdot T_2.$$

Using Eq. (8) leads to the direct dependence of the osmolarity ratio $C/C_0$ and the division parameter d For symmetric vesicles with $l=0.5$ Eq. (18) becomes $$C/C_0 = \frac{2}{\sqrt{2 - (1-d)^2 ((1-d)^2 + 1)}}. \quad (19)$$

Determination of Osmolality

The osmolality of all solutions was measured with the Osmomat 030 (Gonotec GmbH). Be-fore use, the osmometer was calibrated with calibration solutions of 0, 300 and 900 mOsm/kg (Gonotec GmbH). Each measurement was carried out with a sample volume of 50 µl. Note that for the quantities that are calculated here, the osmolality is a good approximation for the osmolarity (see below). The measurement error of the osmometer itself (in terms of reproducibility) is below 0.5%.

Osmolarity Vs. Osmolality

It is important to note that the measurements produced by the Osmomat 030 (Genotec GmbH) indicate the osmolality b of the sample solution. However, according to van't Hoffs law the osmotic pressure depends on the total particle concentration in the solution (osmolarity) C: $\Pi=CRT$, where C is the osmolarity of the solution, R the ideal gas constant and T the temperature. The osmolarity depends linearly on the osmolality $C=(\rho_s-c_a) b$ where $\rho_s$ is the density of the solution and $C_a$ is the anhydrous solvent concentration. The prefactor ($\rho_s$ $c_a$) is dependent on the solvent. It can be neglected in most cases since ($\rho_s$ $c_a$) 1 kg $l^{-1}$. However, for high concentrations of sugars as have been used here, the prefactor can deviate from 1 kg $l^{-1}$. Since we look at the osmotic pressure ratio $C/C_0$, the effect cancels out nevertheless. It can only play a role when using different solutions for the inner and outer phase like in FIG. 1. However, even then, the deviation of the osmotic pressure ratio is negligible: For the solutions that were used here, ($\rho_s-c_a$) did not deviate more than 15% from 1 kg $l^{-1}$. Hence, the deviation of the osmotic pressure ratio $C/C_0$ is below 1%. Furthermore, Moser and Frazer suggested the that the osmotic pressure is better described by $\Pi=NRT=\rho_w bRT$, for higher concentrations of glucose or sugar with $V^!$ the volume of pure water in the solution, $\rho_w$ is the density of pure water and b is the osmolality of the solution. Therefore, we used the osmolality instead of the osmolarity for the calculations.

Enzymatic Osmolarity Change

Invertase from bakers's yeast (*S. cerevisiae*) grade VII, 300 units/mg was purchased from Sigma-Aldrich Corp. Nominally, one unit of the enzyme hydyrolyzes 1 µmol of sucrose per minute to produce fructose and glucose at pH 4.5 at 55° C. The GUV solution obtained from electroformation was mixed with a solution containing 1 mg ml–1 invertase such that the final concentration of invertase was 44.4 mg l–1 and in a second experiment 22.2 mg l–1. Immediately after mixing, a part of the solution was used for division experiments with phase-separated GUVs in a sealed observation chamber. The other part was used for osmolality measurements over time. The experiments were carried out at room temperature.

Light-Mediated Osmolarity Change

CMNB-caged fluorescein (Fluorescein bis-(5-Carboxymethoxy-2-Nitrobenzyl)-Ether, dipotassiumsalt) was purchased from Sigma-Aldrich Corp., dissolved in 100 mM Tris buffer at pH 8.0 at a final concentration of 50 mM and stored at 20° C. until use. Phase-separated GUVs were produced in 13 mM sucrose and mixed with an osmolarity-matched solution of CMNB-caged fluorescein leading to a final concentration of 1.73 mM CMNB-caged fluorescein. Note that the concentration of the sucrose solution was reduced to ensure a sufficiently large osmolarity change despite the limited concentration of the caged fluorescein. Each phase-separated GUV was imaged with confocal fluorescence microscopy for at least 100 s before illumination with 405 nm laser light (70% laser intensity) leading to the uncaging of CMNB-caged fluorescein and hence a local increase in osmolarity.

Absorbance Measurements

The absorbance of CMNB-caged fluorescein was measured with a plate reader (TECAN microplate reader SPARK®) in the range from 300-700 nm using a 96-well plate. The settle time was set to 50 ms. In order to induce uncaging of CMNB-fluorescein, the solution was transferred into a PCR-tube, diluted with MQ and put under a UV-lamp (Hamamatsu LIGHTNINGCURE Spot light source LC8, 100% power). Subsequently, the solution was pipetted into the well-plate again and measured for a second time.

Results and Discussion

Figure 3:
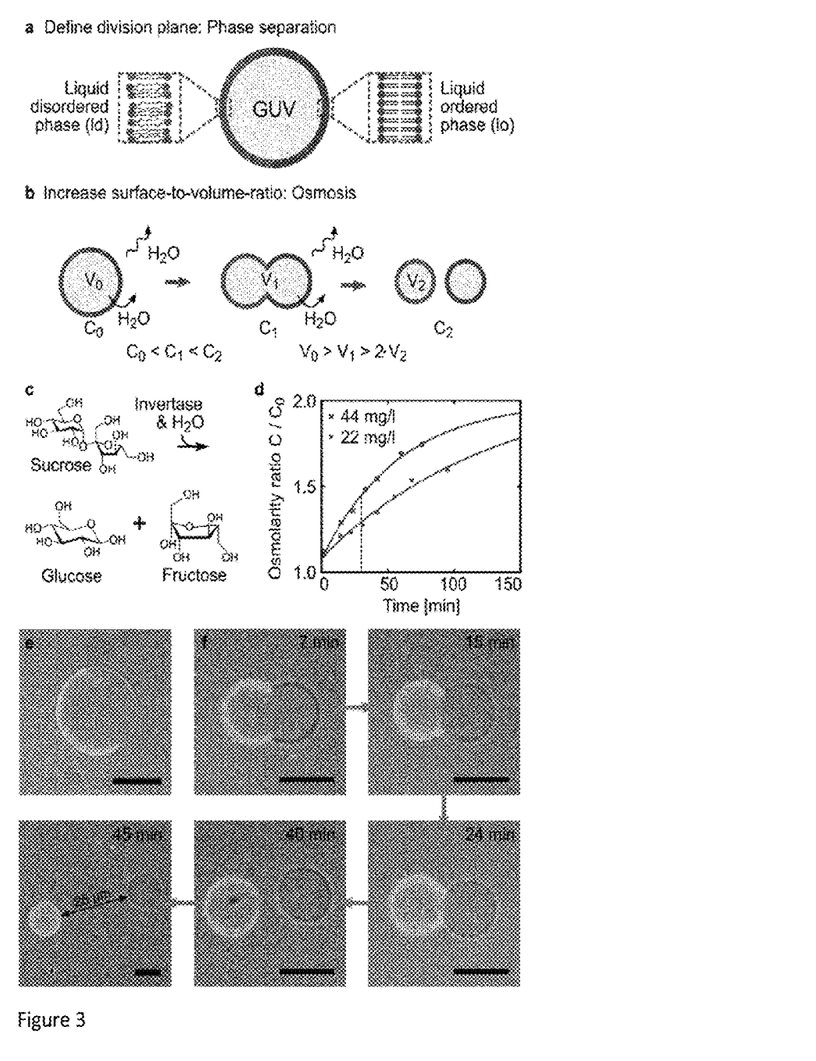

Division of phase-separated GUVs triggered by metabolic decomposition. GUVs—i.e. micron-sized vesicles enclosed by a single lipid bilayer—are the most commonly used compartment type for the assembly of synthetic cells. To realize a controllable and efficient mechanism for their division, we propose a strategy that is based on three steps: Step 1) Define the plane of division; Step 2) Increase the surface-to-volume ratio and Step 3) Enable neck fission to allow for the formation of two smaller daughter compartments from a single large compartment. To realize Step 1, we choose lipid phase separation to define the plane of division as the interface of the liquid disordered (ld, left) and the liquid ordered (lo, right) phase as illustrated in FIG. 3a. Hence, an increase in the surface-to-volume ratio (Step 2) requires a reduction of the GUV's inner volume. To this end, we exploit osmosis. An increase of the osmolarity outside the GUVs, i.e. a higher concentration of solutes in the outer aqueous solution, causes water efflux through the GUV membrane as illustrated in FIG. 3b. Note that the number of lipids in the membrane, i.e. the surface area of the GUV, remains constant during this process. There is no lipid addition. As described in theoretical work before, the GUV deforms to minimize the line tension at the phase boundary until a bud is connected to the mother vesicle by a tight neck. A common assumption is that the energy barrier for neck scission (i.e. the final pinching of the daughter vesicle) is too large to enable vesicle fission without coat proteins. However, while pinching of the lipid constriction comes with an energy cost for opening up the bilayer structure, it also removes the phase boundary. Therefore, we postulate that complete division could be favorable if the line tension is high enough (Step 3). To implement the proposed division mechanism experimentally, we first need a controlled mechanism to increase the outer osmolarity of the solution. Metabolic processes, i.e. the decomposition of molecules through enzymes, inevitably lead to an osmolarity increase. We thus set out to metabolize the sugar solution in which GUVs are often immersed. For this purpose, we make use of the enzyme invertase. Extracellular invertase is secreted by yeast as a form of cell-cell cooperation to decompose sucrose into fructose and glucose (FIG. 3c). We performed osmometer measurements to test if extracellular invertase in a solution of phase-separated GUVs can produce an increase of the osmolarity ratio C/C0 as required for division. Indeed we find that the osmolarity of the initially 300 mM sucrose solution increases significantly over time (see FIG. 3d). The rate of increase depends on the enzyme concentration. In the presence of 44 mg l−1 invertase, the initial osmolarity almost doubles over the course of 150 minutes. Note that we did not optimize the conditions for invertase activity but chose conditions compatible with the proposed mechanism for GUV division. Phase-separated GUVs with two distinct hemispheres (FIG. 3e), were successfully electroformed using a lipid mixture consisting of DOPC, cholesterol, DPPC, CL and LissRhod PE. LissRhod PE labels the ld phase (orange). To test the proposed mechanism for division, we add 44 mg l−1 invertase to the GUV-containing sucrose solution. FIG. 3f shows a time series taken over the course of 45 minutes. We observe the formation of a constriction at the interface of the two phases, eventually leading to complete division. As visible in the final timestep, the daughter vesicles diffuse apart as soon as the division is completed, proving that complete neck scission occurred.

Theoretical Prediction of the Division Process.

Figure 2:
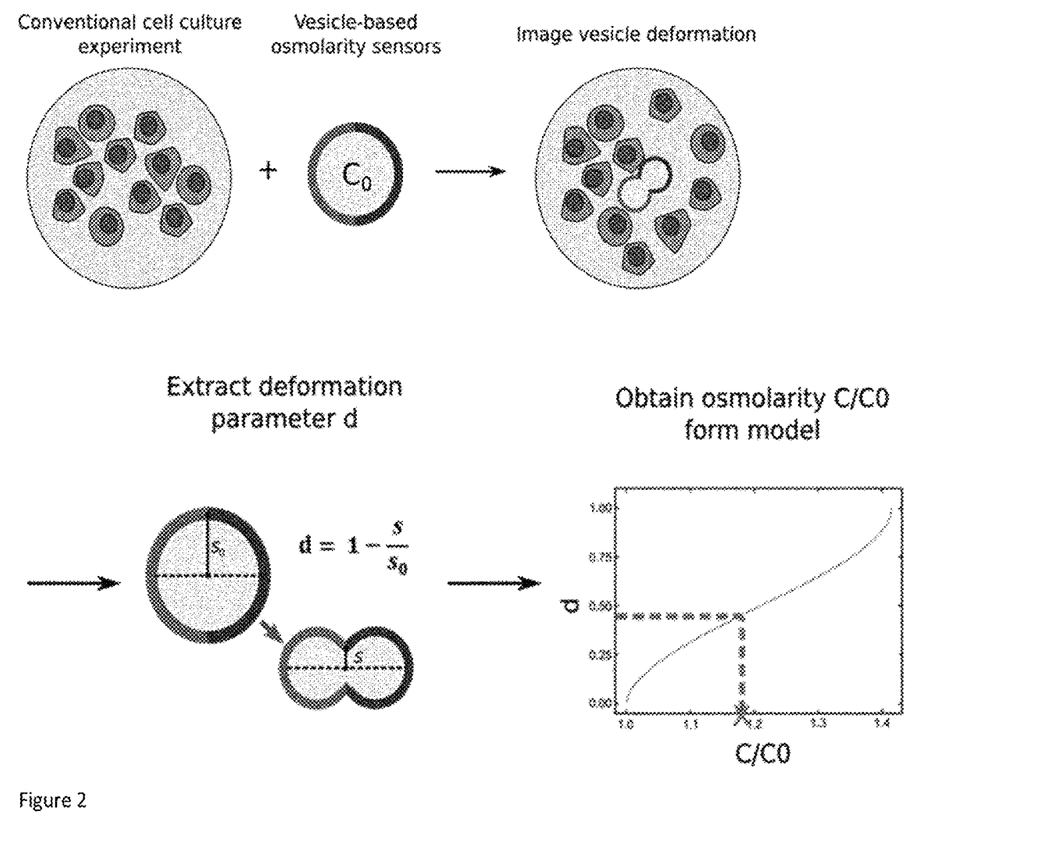
FIG. 2: Illustration of the use of phase-separated vesicles as osmolarity sensors. After the addition of phase-separated vesicles with a suitable inner osmolarity C0 to the respective solution of interest, e.g. the cell medium with an osmolarity C, the vesicles will get deflated and deform in order to reduce the energy associated with the line tension at the phase boundary. From microscopy images of the vesicle, the deformation parameter d can be obtained and the osmolarity C can be calculated according to our theoretical model.

To gain control over the process, we set out to predict the osmolarity ratio required to achieve division of a phase-separated GUV. For this purpose, we develop an analytical model describing the geometrical GUV shape throughout the deformation process as two spherical caps with a base radius $s_0$ for the initially spherical GUV and $s < s_0$ for the deformed GUV. One of them represents the ld phase with a surface area $A_{ld}$ the other one the lo phase with a surface area $A_{lo}$, respectively. The relevant geometrical properties (FIG. 2a) can be extracted from confocal images. This representation provides a good approximation of our experimentally observed GUV shapes including a kink at the phase boundary compared to the dumbbell shape expected for single-phased GUVs. We assume that the total area $A_{tot}$ remains constant throughout the division process. If the outer osmolarity increases ($C > C_0$), the volume of the GUV will decrease due to water efflux. This process is fast compared to the time scale of the division process and therefore assumed to be instantaneous in our model. The equilibrated inner volume is then given by $V = C/C_0 \cdot V_0$. The resulting excess membrane area allows for deformation of the initially spherical GUV. Deformation minimizes the phase boundary ($s < s_0$) to reduce the energy associated with the line tension. To quantify the progression of the division process, we define a division parameter d:

$$d = 1 - \frac{s}{s_0}.$$

d is 0 for the initial spherical GUV and 1 for a divided GUV. Based on these geometrical considerations, the osmolarity ratio $C/C_0$ needed to achieve a certain deformation d for a symmetric GUV ($A_{ld} = A_{lo}$) can be calculated as $$C/C_0 = \frac{2}{\sqrt{2 - (1-d)^2\left((1-d)^2 + 1\right)}}. \tag{1}$$

The model thus postulates that the osmolarity ratio required for complete division (d=1) is $C/C_0 = \sqrt{2} \sim 1.41$ (Prediction 1). Since Equation 1 does not depend on the initial radius $r_0$ of the GUV, the osmolarity ratio required for division is independent of the size of the GUV (Prediction 2). While living cells normally undergo symmetric division, where both second-generation compartments are of similar size, some processes like oocyte maturation rely on asymmetric division. To extend our model for asymmetric GUVs with $A_{ld} \neq A_{lo}$ we define a lipid ratio parameter $l = A_{ld}/A_{tot} = 1 - A_{lo}/A_{tot}$ and hence obtain $$C/C_0 = \frac{1}{T_1 + T_2} \tag{2}$$

with $T_1 = \sqrt{l - (1-d)^2 \cdot (l - l^2)} \cdot (2 \cdot (1-d)^2(l - l^2) + l)$ and $T_2 = \sqrt{(1-l) - (1-d)^2(l-l^2)} \cdot (2(1-d)^2(l-l^2) + (1-l))$.

Detailed derivations of Eq. 1 and 2 are shown above.

Figure 1:
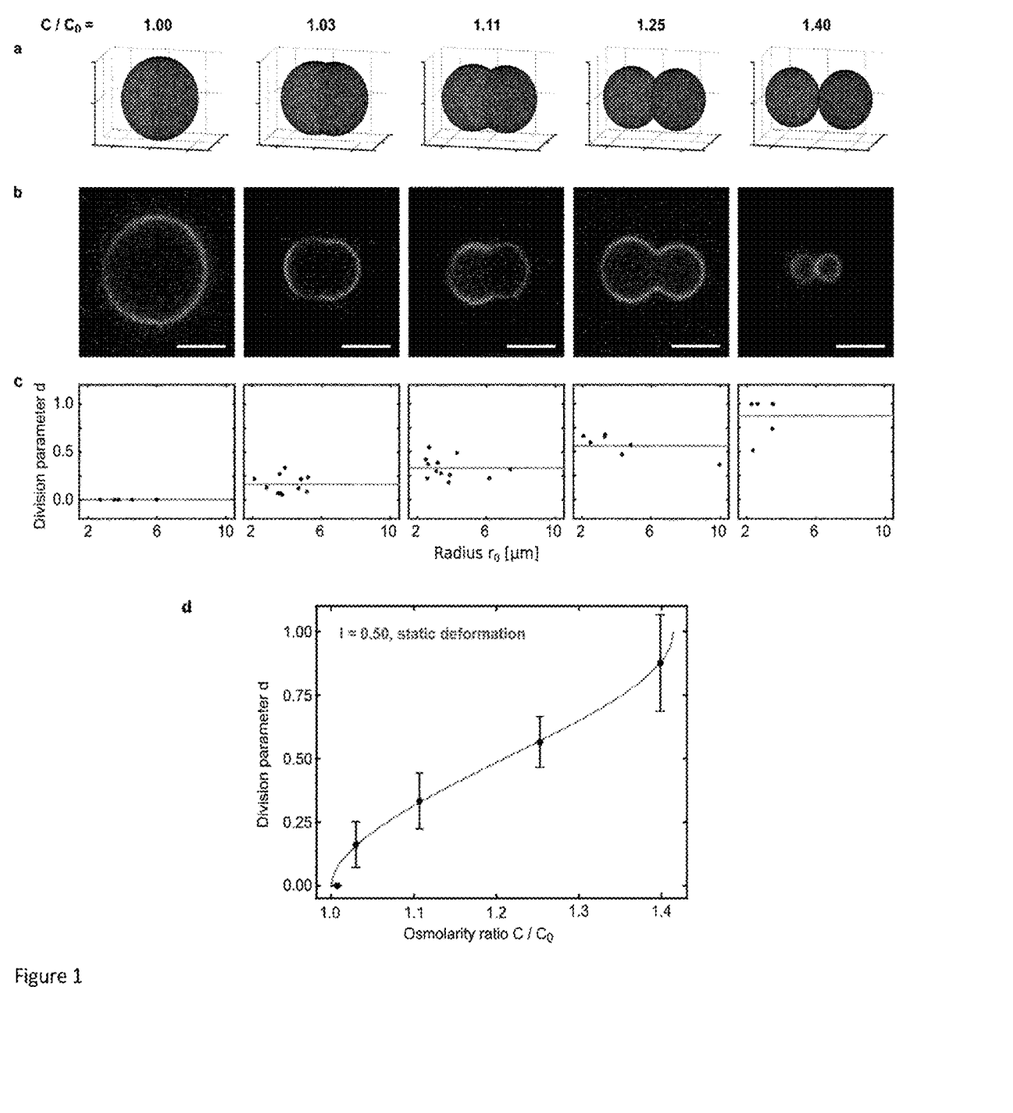
FIG. 1: Phase separated giant unilamellar lipid vesicles and their shapes at different well defined osmolarity ratios as indicated. Using an analytical model without fitting parameters, we can estimate the osmolarity of the solution from the vesicle shape and vice versa. a) Graphical representation of the model prediction for different osmolarity ratios. b) Exemplary confocal images of phase-separated vesicles at different static osmolarity ratios. c) Calculated division parameter in dependence of the initial radius r0 of the phase-separated vesicles for each osmolarity ratio with theoretical prediction verifying that shape deformation is independent on vesicle size. d) Comparison of theory and experimental data. Calculated mean division parameter d (black dots) and theoretical curve (black line).

FIG. 1a shows the theoretically predicted shapes for the different osmolarity ratios. The corresponding representative confocal fluorescence images are presented in FIG. 1b. Note that the shapes are static since the osmolarity ratio is kept constant, unlike in the case of invertase activity. We extract the geometrical parameters required to calculate the division parameter d from multiple images. As postulated, we observe division at an osmolarity ratio of approximately $\sqrt{2}$ (Prediction 1). We find that 90% percent of the GUVs are single-phased (n=200) at this osmolarity ratio, suggesting a remarkably high division rate. To verify the size independence of the division process (Prediction 2), we used the images of the deformed GUVs to calculate the radius r0 of the initially spherical GUV. The scatter plot of the division parameter d over r0 is shown in FIG. 1c. As expected, no significant size-dependent deviations from the theoretical value (blue line) can be observed in the size range of GUVs. For vesicles below 1 µm, size effects and membrane-specific parameters will likely come into play. As a quantitative comparison of the experimental results with the theoretical prediction (Equation 1), we plot the mean division parameter as a function of the osmolarity ratio. FIG. 1d shows that the experimental data agrees well with the theoretical prediction. Deviations may occur due to the fact that GUVs are imaged in solution and can hence rotate in the confocal plane. Trapping can lead to lipid tubulation and hinder the division process. Note that the quantitative understanding of the vesicle shape as a function of the osmolarity ratio allows us to use phase-separated GUVs as precise osmolarity sensors. This could for instance be useful for measuring extracellular osmolarity in cell culture based on conventional microscopy without any additional equipment (conventional osmometer measurements require freezing of the sample).

Figure 4:
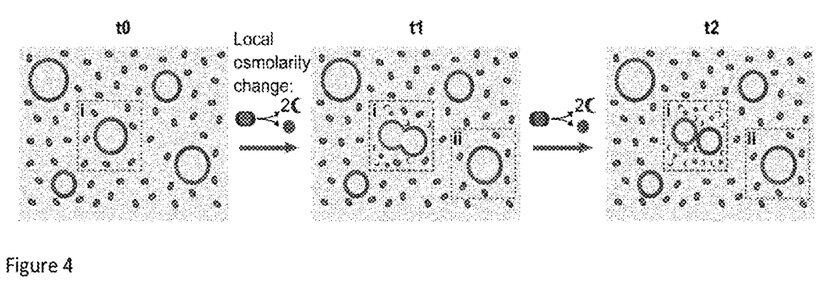

FIG. 4 is an Illustration of a localized osmolarity measurement over time. At a time point to the osmolarity starts to change in the local area (i), e.g. due to metabolic activity of cells present in solution or due to a chemical reaction taking place locally. Hence, the number of solutes in the area (i) is increased at time point t1, leading to the deformation of the GUV localized in area (i). Other GUVs, like the GUV in area (ii) remain unaffected. If the reaction continues over time, the deformation of the GUV continues as illustrated for time point t2.

The invention claimed is:

1. A method for determining osmolarity and/or osmolarity change in a system, comprising:
   providing a phase-separated membrane enclosed compartment, whereby the membrane is permeable to a solvent and non-permeable to the osmotically active substance, and
   determining by optical means the osmolarity or osmolarity change by determining the shape or a change of shape of said phase-separated membrane enclosed compartment, whereby the membrane is permeable to the solvent and non-permeable to the osmotically active substance.

2. The method according to claim 1, wherein the determination of the shape or change of shape is a non-invasive method.

3. The method according to claim 1, wherein determining the osmolarity or osmolarity change is performed using a microscopic image of the shape of phase-separated membrane enclosed compartment.

4. The method according to claim 1, wherein determining the osmolarity or osmolarity change comprises taking microscopic images at different time points.

5. The method according to claim 1 wherein the determining the osmolarity or osmolarity change comprises an in situ measurement of osmolarity change in a biological system.

6. The method according to claim 1 wherein the method is performed to provide for measurement of local osmolarity/osmotic gradient in a biological system based on determining the shape of phase-separated membrane enclosed compartment at different local places.

7. The method according to claim 1 wherein the determining the osmolarity or osmolarity change comprises determining an intracellular osmolarity with the phase-separated membrane enclosed compartment.

8. The method according to claim 1 further comprising calibrating the system with a different phase-separated membrane enclosed compartment with different inner osmolarity.

* * * * *